No. 843,172. PATENTED FEB. 5, 1907.
W. QUIVEY.
VEHICLE WHEEL.
APPLICATION FILED JUNE 27, 1906.
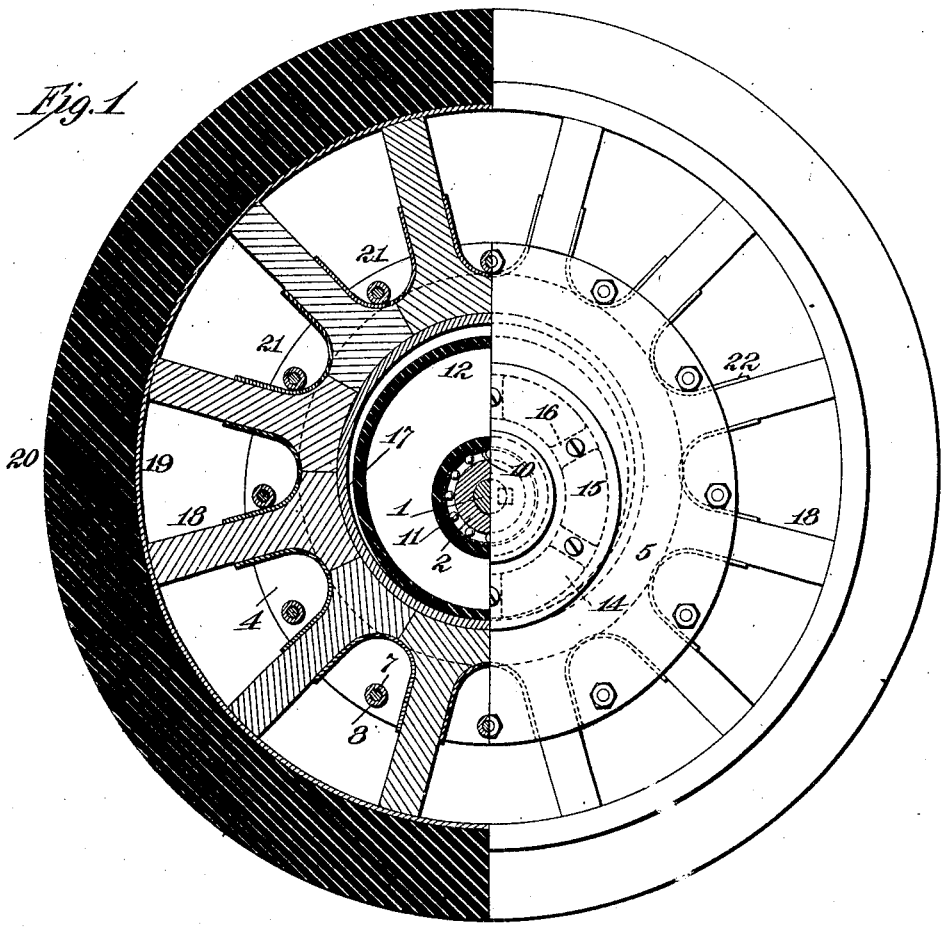
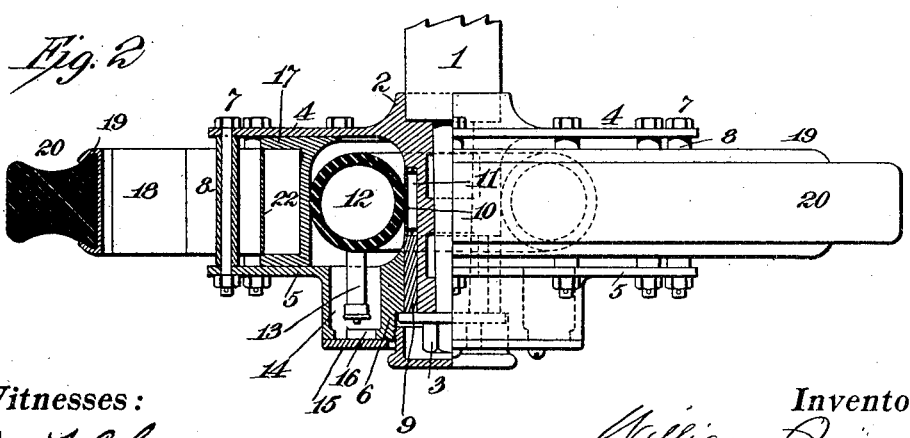
Witnesses: Inventor

UNITED STATES PATENT OFFICE.

WILLIAM QUIVEY, OF EAST ORANGE, NEW JERSEY.

VEHICLE-WHEEL.

No. 843,172.  Specification of Letters Patent.  Patented Feb. 5, 1907.

Application filed June 27, 1906. Serial No. 323,556.

*To all whom it may concern:*

Be it known that I, WILLIAM QUIVEY, a citizen of the United States, residing at East Orange, in the county of Essex and State of New Jersey, have invented a certain new and useful Improvement in Vehicle - Wheels, of which the following is a description.

The object I have in view is to produce a vehicle-wheel of that class wherein an elastic cushion is interposed intermediate between the hub and rim of the wheel and wherein a more effective and practical construction will be obtained.

The invention particularly includes an effective means for driving or communicating motion between the two parts of the wheel located on opposite sides of the intermediate cushion and for absorbing shocks by permitting a movement of rotation of the outer section of the wheel independent of the connecting driving means in all positions of the wheel, and this without straining the intermediate elastic cushion.

The invention in its preferred form of execution also includes the idea of supporting the weight in all positions of the wheel partly by the rigid or non-elastic connection between the two sections of the wheel, thus relieving the intermediate elastic cushion of part of the weight, the independent rotary motion of the outer section of the wheel in all positions permitting the absorbing of shocks by the intermediate elastic cushion.

The preferred form of carrying out the invention is illustrated in the accompanying drawings, in which—

Figure 1 is a vertical half elevation and half-section of the wheel, and Fig. 2 is a half-plan view and half-horizontal section.

The axle 1 enters the axle-box 2 and is keyed therein if the wheel and axle turn together, the axle being provided on its end with a flanged nut 3. The axle-box 2 is made in one piece with a flange 4 to form one side of the hub, while the other side of the hub is formed by a face-plate 5, made in one piece with a sleeve 6, which surrounds the outer end of the axle-box. The flanges 4 and 5 are secured together near their peripheries by cross-bolts 7, carrying, preferably, antifriction - sleeves 8. The wheel is preferably provided with one of these cross-bolts 7 for each spoke of the wheel, the cross-bolts passing through the spaces between the spokes; but a lesser number of the cross-bolts may be employed, providing there are three or more of such bolts. Between the sleeve 6 and the axle-box is placed a sleeve 9, so as to form a raceway centrally around the axle-box, in which is placed a loose ring 10, supported by antifriction rollers or balls 11.

Surrounding the ring 10 and bearing upon it is the intermediate elastic cushion 12, which may be a pneumatic cushion or a filled or solid rubber cushion. In case a pneumatic cushion is employed space to accommodate the laterally-projecting valve 13 of the cushion and to permit the rotary movement of the cushion without injury to the valve is provided by making the face-plate 5 with an annular chamber 14, which is closed by an annular plate 15, screwed to cross-bars 16, these cross-bars connecting the face-plate with the sleeve 6 and leaving openings between them, through which access can be had to the valve 13 in any position of rotation of the pneumatic cushion 12.

Surrounding the elastic cushion 12 is a channeled ring 17, which is held between the flanges 4 and 5, but is allowed free movement in the space between these flanges. The spokes 18 of the wheel are supported upon the ring 17 in any suitable way, and these spokes in turn support a rim 19, preferably carrying an elastic tire 20, which may be a solid rubber tire. The spaces 21 between the inner ends of the spokes are provided with wearing-plates 22, upon which the sleeves 8 of the cross-bolts 7 bear. These spaces 21 are considerably wider than the cross-bolts and their encircling sleeves, so as to leave room for considerable independent rotational movement of the two parts of the wheel. The driving between the two parts of the wheel is effected by the bearing of the sleeves 8 of the cross-bolts 7 on the wearing-plates 22 on the opposite sides and bottoms of the spaces 21. These spaces 21 widen in an outward direction, so as to have a general V shape, and preferably have rounded bottoms at the points of the V. Consequently the farther away the cross-bolts are from the bottoms of the spaces the wider will be the space in which such cross-bolts can play before striking the wearing-plates.

The position of the parts of the wheel when carrying the weight of the vehicle is shown in Fig. 1. The cross-bolt at the top of the wheel is shown as in contact with the bottom of the wearing-plate at the narrowest point of the space 21. This is the preferable position of the parts when the vehicle is carrying its normal load. The two cross-bolts on opposite sides of the central top bolt are also in contact with the wearing-plates. From this point downwardly on both sides of the wheel the cross-bolts are increasingly separated from the wearing-plates, the bottom bolt being located at the center of the space 21 and at the maximum distance from the bottom of that space. One part of the wheel is driven from the other part by the bolts at the top of the wheel.

In the running of the vehicle inequalities of the roadway produce shocks, which are received by the wheel on its lower side, and by reason of the peculiar driving connection between the two sections of the wheel the lower part of the wheel yields or moves rearwardly under the effect of these shocks, turning upon the cross-bolts at the top of the wheel as a pivot eccentrically with relation to the hub of the wheel and compressing the elastic cushion 12 on the forward side of the wheel. In this way shocks are absorbed by the elastic cushion 12 and are not transmitted to the axle.

Any creeping or rotational movement of the elastic cushion 12 caused by the independent rotational movements of the two sections of the wheel are permitted by the loose ring 10, upon which the cushion 12 is mounted, without straining or wearing the cushion.

The construction permits of the lubrication of the rubbing surfaces where the face-plates 4 5 and the sides of the channeled ring 17 meet by introducing into the spaces at the sides of the cushion 12 powdered graphite or other suitable lubricant. The lubricant works outwardly between the rubbing surfaces. The cover 15 makes a tight closure of the chamber in which the cushion 12 is located except at these rubbing surfaces.

What I claim is—

1. In a vehicle-wheel, the combination with inner and outer sections and an intermediate elastic cushion, of means for driving one section of the wheel from the other independent of the intermediate elastic cushion, such driving means connecting the two sections at the top of the wheel in all positions of rotation of the wheel and leaving the outer section free to move rotatively independently of the inner section on the lower side of the wheel, substantially as set forth.

2. In a vehicle-wheel, the combination with inner and outer sections and an intermediate elastic cushion, of cross-bolts on the inner section passing through V-shaped openings in the outer section, whereby one part of the wheel will be driven by the other by the cross-bolts at the top of the wheel in all positions of rotation, substantially as set forth.

3. In a vehicle-wheel, the combination with inner and outer sections and an intermediate elastic cushion, of means for driving one section from the other independent of the intermediate elastic cushion engaging at the top of the wheel in all positions of rotation and leaving the outer section free to yield rotatively at the bottom of the wheel, such driving means relieving the intermediate elastic cushion of part of the weight of the vehicle, substantially as set forth.

4. In a vehicle-wheel, the combination with inner and outer sections and an intermediate elastic cushion, of a loose ring or carrier on the inner section upon which the cushion is mounted, and cross-bolts on the inner section passing through V-shaped slots on the outer section for driving one section of the wheel from the other at the top of the wheel in all positions of rotation, and permitting the outer section to yield at the bottom of the wheel, substantially as set forth.

This specification signed and witnessed this 26th day of June, 1906.

WILLIAM QUIVEY.

Witnesses:
JOHN L. LOTSCH,
AUG. LONG.